United States Patent [19]

Wagner

[11] 4,393,750
[45] Jul. 19, 1983

[54] BRAKE BOOSTER

[75] Inventor: Wilfried Wagner, Frankfurt am Main, Fed. Rep. of Germany

[73] Assignee: ITT Industries, Inc., New York, N.Y.

[21] Appl. No.: 278,134

[22] Filed: Jun. 29, 1981

[30] Foreign Application Priority Data

Aug. 7, 1980 [DE] Fed. Rep. of Germany ....... 3029911

[51] Int. Cl.³ .............................................. F15B 9/10
[52] U.S. Cl. ................................. 91/376 R; 91/369 A
[58] Field of Search ............. 91/369 A, 376 R, 369 R, 91/369 B; 60/547 R, 554; 403/51, 288; 285/225, DIG. 22

[56] References Cited

U.S. PATENT DOCUMENTS 3,645,547 2/1972 Glover ........................ 285/DIG. 22

FOREIGN PATENT DOCUMENTS 2922299 6/1979 Fed. Rep. of Germany ... 91/369 A
2037918 7/1980 United Kingdom ............. 91/369 A
2040376 8/1980 United Kingdom ............. 91/369 A
2053395 2/1981 United Kingdom ............. 91/369 A Primary Examiner—Paul E. Maslousky
Assistant Examiner—A. M. Bradley
Attorney, Agent, or Firm—John T. O'Halloran; Alfred C. Hill

[57] ABSTRACT

A low-pressure brake booster for automotive vehicles comprises a low-pressure casing sealingly subdivided into a low-pressure chamber and a working chamber by means of an axially movable wall. The axially movable wall is connected to an axially movable control valve housing of a control valve via a transmitting sleeve having longitudinal slots. The inside diameter of the transmitting sleeve exceeds the outside diameter of a reinforcement tube interconnecting the transverse end walls of the low-pressure casing. Arranged at the end of the reinforcement tube adjacent the working chamber are radial extensions which extend through the longitudinal slots of the transmitting sleeve and are connected to the adjacent transverse end wall of the low-pressure casing.

9 Claims, 4 Drawing Figures

BRAKE BOOSTER

BACKGROUND OF THE INVENTION

The present invention relates to a brake booster for automotive vehicles comprising a low-pressure casing which is sealingly subdivided into a low-pressure chamber and a working chamber by an axially movable wall, a reinforcement tube extending axially through the low-pressure casing having its ends secured to the two transverse end walls of the low-pressure casing and sealed relative to the movable wall, a mechanically actuatable control valve to connect the working chamber to the low-pressure chamber or to atmosphere, the control valve being enclosed in an axially movable housing which via a push rod communicates with an actuating piston of a master cylinder fastened to the low-pressure casing on the transverse end wall adjacent to the low-pressure chamber, and communicates via a force-transmitting device with the movable wall, the force transmitting device extending through recesses of the reinforcement tube in the area of the working chamber as disclosed in copending U.S. application of H. Seip, Ser. No. 238,797, filed Feb. 27, 1981, assigned to the same assignee as the present application.

A light-weight construction in addition to a shortest possible overall length are aimed at in brake boosters for automotive vehicles. To enable the low-pressure casing to be constructed as light as possible, the force which develops during brake actuation and which is transmitted from the master cylinder onto the point where the brake booster is fastened to the automotive vehicle, for example, to the splashboard, will no longer be transmitted via the low-pressure casing, but via a central reinforcement tube according to more recent proposals.

To transmit the boosting force from the axially movable wall onto the control valve housing, a force-transmitting device is required which extends through recesses of the reinforcement tube.

These recesses may be arranged in the area of the low-pressure chamber of the brake booster as disclosed in U.S. copending application of J. Belart, Ser. No. 141,830, filed Apr. 21, 1980, now U.S. Pat. No. 4,347,779, issued Sept. 7, 1982 assigned to the same assignee as the present application. However, a difficulty is encountered in this construction since the recesses have to be placed outside the axial area which is overridden when the wall moves by the seal between the movable wall and the reinforcement tube, which can, for instance, be constructed as a rolling diaphragm. Otherwise, special covers or the like will have to be provided for these recesses to prevent the seal from being damaged. In this structure, the force-transmitting device is composed of a sleeve connected to the control valve housing and formed integrally therewith, from which sleeve extend radial ribs through the recesses of the reinforcement tube to establish a connection with a hub member of the movable wall.

An essentially less complicated construction of the force-transmitting device in the form of simple radial ribs extending directly from the movable wall to the control valve housing can be accomplished by an embodiment where the recesses of the reinforcement tube are disposed in the area of the working chamber as disclosed in U.S. copending application of J. Belart and F. Wienecke, Ser. No. 61,113, filed July 26, 1979, assigned to the same assignee as the present application. A slidable seal of the movable wall on the reinforcement tube is effected in the area adjoining the recesses on the side close to the low-pressure chamber. Since both the length of the recesses in the form of longitudinal slots and the length of the neighboring seal are at least equal to the power stroke of the movable wall, the length of the reinforcement tube is required to be greater than the double power stroke of the movable wall, which results in a comparatively large overall length of the brake booster.

To avoid the difficulties caused by the recesses in the reinforcement tube with regard to the sealing or to the overall length, it has also been previously suggested in a U.S. copending application of H. Seip, Ser. No. 238,797, filed Feb. 27, 1981, assigned to the same assignee as the present application to construct the force-transmitting device as bolts which extend from the movable wall through a seal in the transverse end wall of the low-pressure casing to a pressure plate fitted to the end of the control valve housing close to the pedal. In this arrangement, however, there is the difficulty of sealing the bolts in the housing end wall. Besides, the mounting space which is usually available for standard brake boosters in the engine compartment will be exceeded.

SUMMARY OF THE INVENTION

It is, therefore, an object of the present invention to provide an improved brake booster of the type referred to hereinabove having a straightforward construction which is less susceptible to interferences as well as a shortest possible overall length.

A feature of the present invention is the provision of a brake booster for automotive vehicles comprising: a low-pressure casing having a longitudinal axis; an axially movable wall disposed in the casing in a coaxial and transverse relationship with the axis to subdivide the casing into a low-pressure chamber and a working chamber; a mechanically actuatable control valve to connect the working chamber to a selected one of the low-pressure chamber and atmosphere, the control valve being disposed in an axially movable control valve housing disposed coaxial of the axis in communication with a master cylinder piston actuating push rod; a force-transmitting sleeve having a plurality of longitudinal slots disposed in the casing coaxial of the axis, one end of the sleeve being connected to the housing and the other end of the sleeve being connected to the movable wall; and a reinforcement tube extending coaxial of the axis through the casing having an outside diameter less than the inside diameter of the sleeve, the tube being sealed to the movable wall, having one end connected to one end wall of the casing in a transverse relationship to the axis adjacent the low-pressure chamber and having a plurality of radial extensions adjacent the other end of the tube in the working chamber, each of the plurality of radial extensions extending through a different one of the plurality of longitudinal slots and connected to the other end wall of the casing in a transverse relationship with the axis adjacent the working chamber.

This construction obviates the need for longitudinal slots in the reinforcement tube, the length of the slots being defined by the power stroke of the movable wall and the slots thereby influencing the overall length of the brake booster. In this structure, the longitudinal slots whose length depends on the power stroke of the movable wall are arranged at the force-transmitting sleeve. Since the force-transmitting sleeve moves together with the wall, there will be no difficulties encountered by the longitudinal slots possibly getting in the area of the axially movable seal. The recesses of the reinforcement tube are thereby formed by the space between radial extensions by which the reinforcement tube is fitted to the end wall. Upon movement of the movable wall, the transmitting sleeve will slide across the reinforcement tube and will also override an area of the reinforcement tube which represents a portion of the movable seal towards the movable wall.

In an improvement of the idea of the present invention, the end wall close to the working chamber includes a central dome which encloses the control valve housing and a part of the transmitting sleeve in the inactivated position. A particularly short overall length of the brake booster is thereby achieved.

Expediently, the transmitting sleeve includes a radial collar engaging behind the movable wall so that a positive force-transmitting engagement is provided between the movable wall and the transmitting sleeve without particular additional components. Since, in this arrangement, there will occur no high tension in the movable wall, the latter is allowed to be made of plastics resulting in a further reduction in weight.

It has proved particularly advantageous to secure the collar of the transmitting sleeve to the movable wall by means of a prop ring which is simultaneously able to serve for the fastening and the radial support of a rolling diaphragm sealing the movable wall relative to the reinforcement tube. This leads to a considerable simplification of assembly and to a reduction of the number of components.

In a preferred embodiment of the present invention, the control valve housing is sealed relative to the reinforcement tube by means of a pleated bellows, which is particularly suitable in this case, because the control valve housing is no longer placed within the reinforcement tube in the inactivated position.

BRIEF DESCRIPTION OF THE DRAWING

Above-mentioned and other features and objects of this invention will become more apparent by reference to the following description taken in conjunction with the accompanying drawings, in which.

DESCRIPTION OF THE PREFERRED EMBODIMENT

Figure 1:
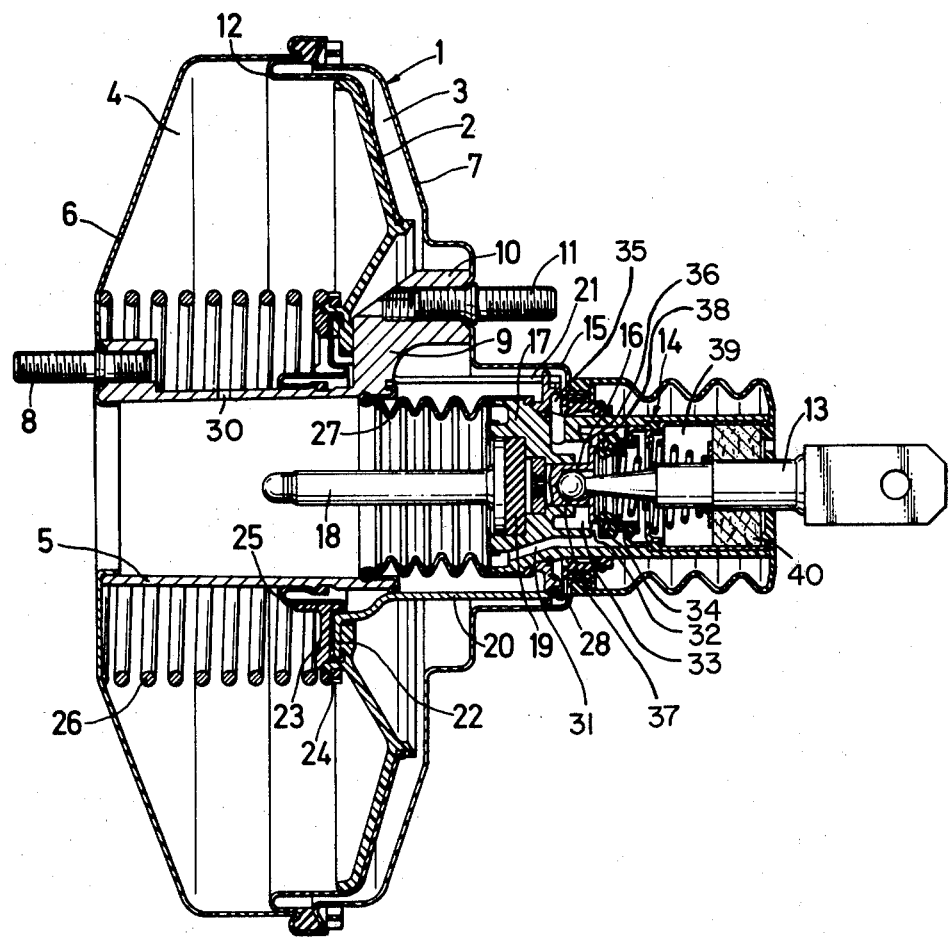
FIG. 1 is a longitudinal cross-sectional view of a brake booster in accordance with the principles of the present invention.

The brake booster shown in FIG. 1 includes a low-pressure casing 1 which is subdivided into a working chamber 3 and a low-pressure chamber 4 by an axially movable wall 2. Extending axially through the low-pressure casing 1 is a reinforcement tube 5 whose ends are fastened to the two transverse end walls 6 and 7 of the low-pressure casing 1.

At its end close to low-pressure chamber 4, reinforcement tube 5 is connected to end wall 6 and a non-illustrated master cylinder of the brake unit by means of thread bolts 8. At its other end, reinforcement tube 5 includes radial extensions 9 which pass over into screw-in eyes 10 extending axially and communicating with end wall 7 and a non-illustrated splashboard of the automotive vehicle by means of thread bolts 11.

The axially movable wall 2 comprises a diaphragm plate made of plastics, between whose outer circumference and the low-pressure casing 1 a rolling diaphragm 12 is arranged as a seal.

When in its inactivated position, a control valve 14 actuatable by a piston rod 13 is located outside the end of reinforcement tube 5 close to working chamber 3, in a central dome 15 of end wall 7 and includes a control valve piston 16 which is connected to the piston rod 13 and which will open valve openings in a control valve housing 17 in such a manner that working chamber 3 will communicate with low-pressure chamber 4 in the rest position shown in FIG. 1. Low-pressure chamber 4 communicates with work chamber 3 through opening 30 in tube 5, the interior of tube 5, axial passage 31, radial passage 32 past valve member 34 in the position illustrated, chamber 33 and passage 35. Actuation of control valve 14, i.e. axial displacement of piston rod 13, will interrupt the connection between low-pressure chamber 4 and working chamber 3 by closing radial passage 32 by movement of valve member 24 to abut at valve seat 36. A further movement of piston rod 13 to the left causes valve piston 37 to lift from valve member 34 at 38 to thereby connect working chamber 3 to atmosphere chamber 39 and air filter 40 so that movable wall 2 will move towards low-pressure chamber 4.

The axially movable control valve housing 17 is connected via an elastic reaction disc 19 to a push rod 18. Push rod 18 acts on an actuating piston of the master cylinder of the brake unit.

Figure 2:
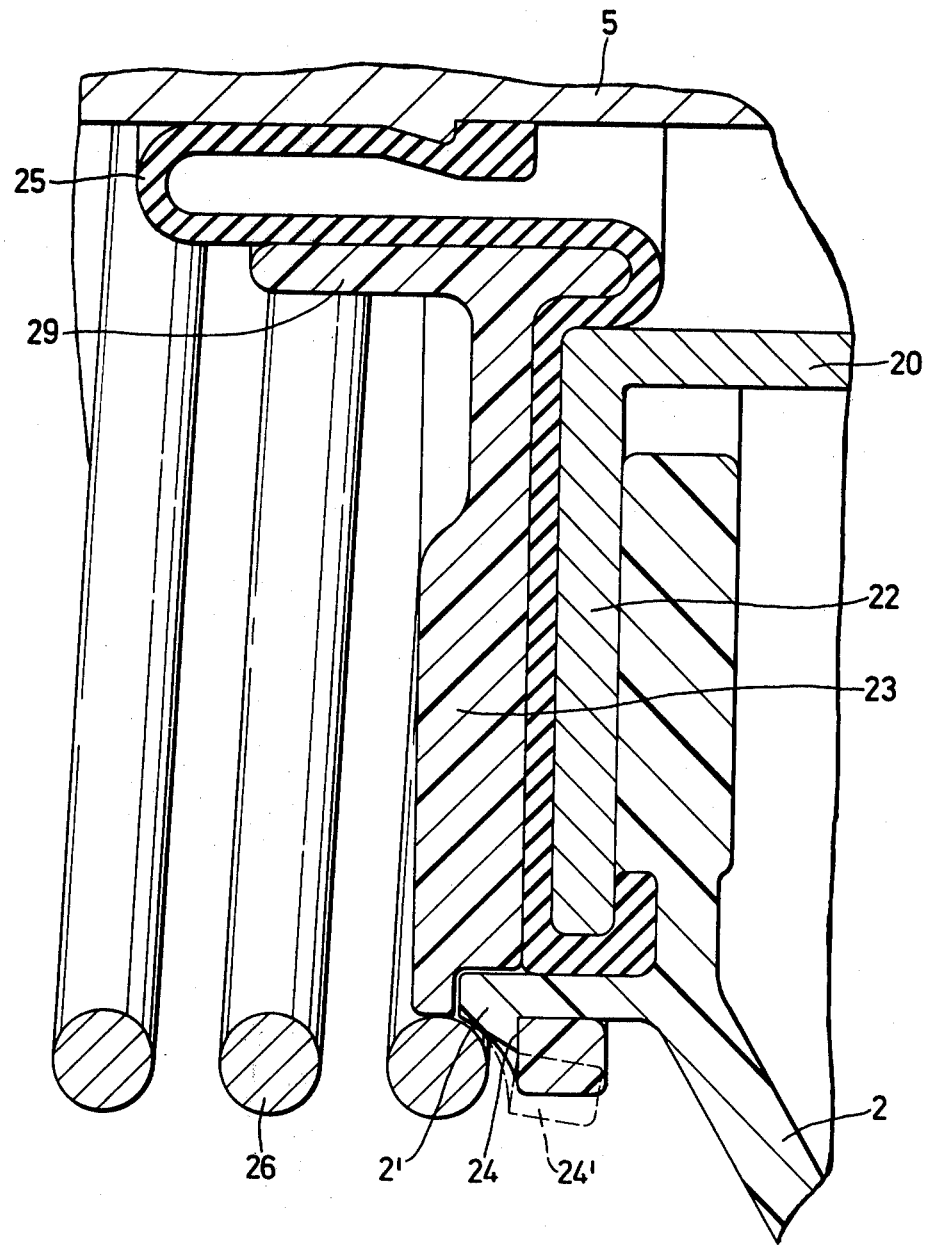
FIG. 2 is an enlarged sectional view illustrating the connection of the transmitting sleeve to the movable wall of the brake booster of FIG. 1.

A transmitting sleeve 20, the inside diameter of which is greater than the outside diameter of reinforcement tube 5, includes longitudinal slots 21 having radial extensions 9 of tube 5 extending therethrough. At its end close to low-pressure chamber 4, transmitting sleeves 20 has a flange-like collar 22 which engages behind movable wall 2 and is secured thereto by means of a prop ring 23. Prop ring 23 is connected to the diaphragm plate of movable wall 2 via a snap-in connection 24 (FIG. 2). At the same time, prop ring 23 serves for fastening a rolling diaphragm 25 which forms a movable seal between wall 2 and reinforcement tube 5. A cylindrical inner section 29 of prop ring 23 forms a support for the rolled fold of rolling diaphragm 25. By means of prop ring 23, there is also held and guided at the movable wall 2 a compression spring 26 which takes support on the end wall 6 and which serves to move movable wall 2 back to its initial position.

The snap-in connection 24 (FIG. 2) is established by resilient loops 24' at the prop ring 23. As is indicated in FIG. 2 by dotted lines, loops 24' are able to spring outwardly (towards the center line of the booster) permitting hooks 2' connected to movable wall 2 to be introduced until the resilient loops 24' skip hooks 2' and take the position shown in FIG. 2 by solid lines, with the hooks 2' of the movable wall 2 being held captive.

Provided as a seal between control valve housing 17 and reinforcement tube 5 is a pleated bellows 27 which may be replaced by a rolling diaphragm or a slide seal.

Figure 3:
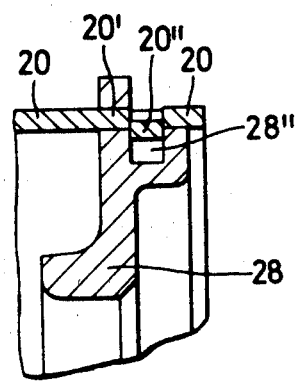
FIG. 3 is an enlarged partial cross-sectional view of the spacer ring of the brake booster of FIG. 1.
Figure 4:
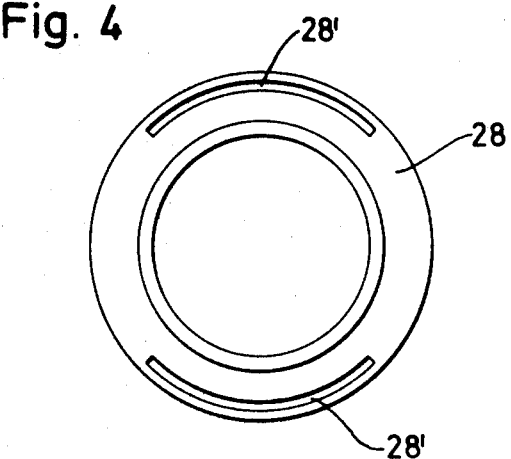
FIG. 4 is a view of the spacer ring from the left-hand side.

The connection of the pedal-side end of transmitting sleeve 20 with control valve housing 17, which is made of plastics, for instance, is established via a spacer ring 28 (FIG. 3), which communicates with the longitudinally slotted transmitting sleeve 20 by sheared indentations. Sleeve portions 20' which project from the end of the transmitting sleeve 20 close to working chamber 3 extend through slots 28' (FIG. 4) of spacer ring 28. Preferably, there are provided two slots 28' in the spacer ring 28 lying opposite each other. Sheared indentations 20" of the sleeve portions 20' are sheared and forced into an associated one of the recess 28" at the periphery of spacer ring 28. This way, transmitting sleeve 20 is rigidly connected to spacer ring 28, and also prevents a radial expanding of transmitting sleeve 20 at the same time.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake booster for automotive vehicles comprising:
   a low-pressure casing having a longitudinal axis;
   an axially movable wall disposed in said casing in a coaxial and transverse relationship with said axis to subdivide said casing into a low-pressure chamber and a working chamber;
   a mechanically actuatable control valve to connect said working chamber to a selected one of said low-pressure chamber and atmosphere, said control valve being disposed in an axially movable control valve housing disposed coaxial of said axis in communication with a master cylinder piston actuating push rod;
   a force-transmitting sleeve having a plurality of longitudinal slots disposed in said casing coaxial of said axis, one end of said sleeve being connected to said housing and the other end of said sleeve being connected to said movable wall; and
   a reinforcement tube extending coaxial of said axis through said casing having an outside diameter less than the inside diameter of said sleeve, said tube being sealed to said movable wall, having one end connected to one end wall of said casing in a transverse relationship to said axis adjacent said low-pressure chamber and having a plurality of radial extensions adjacent the other end of said tube in said working chamber, each of said plurality of radial extensions extending through a different one of said plurality of longitudinal slots and connected to the other end wall of said casing in a transverse relationship with said axis adjacent said working chamber.

2. A brake booster according to claim 1, wherein said end wall of said casing includes a central dome coaxial of said axis enclosing said housing and a portion of said sleeve in an inactive position of said booster.

3. A brake booster according to claims 1 or 2, wherein said sleeve includes and end extending into said low-pressure chamber having a radial collar thereon engaging said movable wall at a surface thereof in said low-pressure chamber, and further including means disposed in a transverse relationship to said axis to lock said radial collar to said surface of said movable wall in an actuating direction of said movable wall.

4. A brake booster according to claim 3, wherein said means to lock said radial collar to said movable wall is a prop ring.

5. A brake booster according to claim 4, wherein said prop ring, in addition to locking said radial collar to said movable wall, provides a radial support for a rolling diaphragm sealing said movable wall relative to said tube.

6. A brake booster according to claim 5, further including
   a pleated bellows to seal said housing relative to said tube.

7. A brake booster according to claim 4, further including
   a pleated bellows to seal said housing relative to said tube.

8. A brake booster according to claim 3, further including
   a pleated bellows to seal said housing relative to said tube.

9. A brake booster according to claims 1 or 2, further including
   a pleated bellows to seal said housing relative to said tube.

* * * * *